United States Patent
Kaneko et al.

(10) Patent No.: US 7,230,052 B2
(45) Date of Patent: Jun. 12, 2007

(54) EPOXY RESIN COMPOSITION AND FIBER REINFORCED COMPOSITE MATERIAL USING EPOXY RESIN COMPOSITION

(75) Inventors: Takashi Kaneko, Nagoya (JP); Kazutami Mitani, Nagoya (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 221 days.

(21) Appl. No.: 11/016,742

(22) Filed: Dec. 21, 2004

(65) Prior Publication Data

US 2005/0101748 A1    May 12, 2005

Related U.S. Application Data

(62) Division of application No. 10/148,873, filed as application No. PCT/JP00/08795 on Dec. 13, 2000, now Pat. No. 6,875,825.

(30) Foreign Application Priority Data

Dec. 13, 1999   (JP)   ................... 11/352899

(51) Int. Cl.
  *B32B 17/04*   (2006.01)
  *B32B 27/04*   (2006.01)
  *C08L 63/02*   (2006.01)
  *C08L 63/04*   (2006.01)

(52) U.S. Cl. .................. 525/113; 428/297.4; 525/486; 525/526

(58) Field of Classification Search ............... None
  See application file for complete search history.

(56) References Cited

U.S. PATENT DOCUMENTS

| 4,366,108 | A | | 12/1982 | Urech et al. |
|---|---|---|---|---|
| 4,490,273 | A | | 12/1984 | Shimp |
| 4,528,305 | A | | 7/1985 | Henry |
| 5,075,356 | A | * | 12/1991 | Crosby et al. .............. 523/429 |
| 5,179,139 | A | | 1/1993 | Sugimori et al. |
| 6,322,848 | B1 | | 11/2001 | Phenis et al. |
| 6,620,510 | B1 | * | 9/2003 | Taguchi et al. ............. 428/413 |
| 6,838,176 | B2 | | 1/2005 | Goto et al. |

FOREIGN PATENT DOCUMENTS

| CS | 272065 | B1 | 1/1991 |
|---|---|---|---|
| CZ | 280462 | B6 | 1/1996 |
| EP | 366068 | | 5/1990 |
| EP | 366068 | A2 | 5/1990 |
| JP | 47-30797 | B4 | 11/1972 |
| JP | 59-59719 | | 4/1984 |
| JP | 61-166826 | | 7/1986 |
| JP | 63-90539 | | 4/1988 |
| JP | 3-160020 | | 7/1991 |
| JP | 03160020 | A | 7/1991 |
| JP | 4-339818 | | 11/1992 |
| JP | 04339818 | A | 11/1992 |
| JP | 6-329763 | | 11/1994 |
| JP | 06329763 | A * | 11/1994 |
| JP | 9-137043 | | 5/1997 |
| JP | 09137043 | A | 5/1997 |

* cited by examiner

*Primary Examiner*—Robert Sellers
(74) *Attorney, Agent, or Firm*—Oblon, Spivak, McClelland, Maier & Neustadt, P.C.

(57) ABSTRACT

A composition useful as a matrix for fiber-reinforced composites possesses a viscosity at 25° C. of no more than 1000 mPa·s and provides a cured product displaying a breaking elongation of at least 5%. The composition comprises (A) at least one of a bisphenol epoxy resin (A1) and a phenol novolak epoxy resin (A2), a polyvalent epoxy resin formed from a mononuclear aromatic backbone (B), an aromatic amine curing agent (C), and a rubber (D).

16 Claims, No Drawings

EPOXY RESIN COMPOSITION AND FIBER REINFORCED COMPOSITE MATERIAL USING EPOXY RESIN COMPOSITION

This is a divisional application of U.S. application Ser. No. 10/148,873 filed Jun. 11, 2002, now U.S. Pat. No. 6,875,825.

TECHNICAL FIELD

The present invention relates mainly to an epoxy resin composition suitable as a matrix resin for a fiber reinforced composite material, and a fiber reinforced composite material using such an epoxy resin composition.

The present application is based upon a patent application filed in Japan (Japanese Patent Application No. Hei 11-352899), and the entire content of this Japanese application is incorporated by reference herein.

BACKGROUND ART

Epoxy resin compositions, on curing, produce cured products with superior mechanical characteristics, electrical characteristics and adhesion, and are consequently widely used for applications such as sealants for electronic materials, paints, paving materials, and adhesives. Furthermore, recently epoxy resin compositions have also started to be used as matrix resins for fiber reinforced composite materials, with wide ranging applications, from aircraft components through to everyday items such as fishing rods and golf club shafts.

Methods of forming fiber reinforced composite materials with good levels of productivity which are currently attracting interest include resin transfer molding (RTM) methods in which a liquid resin composition is injected into a mold which has been filled with a reinforced fiber preform material, and the mixture is subsequently cured, draw molding methods in which a liquid resin composition is impregnated into a reinforced fiber yarn, and this impregnated yarn is then drawn into a mold and cured in a short time period, and filament winding molding methods in which a liquid resin composition is impregnated into a reinforced fiber yarn, and this impregnated yarn is then wound around a mandrel and cured. Of these methods, the RTM method offers the advantage of enabling cured products of complex shapes to be produced at low cost.

In order to form a fiber reinforced composite material using these types of highly productive methods, the matrix resin must be of low viscosity, the low viscosity must be sustainable, and the cured product produced by curing the resin must display superior mechanical characteristics and heat resistance. Particularly in the case of RTM molding methods, matrix resins in which a low viscosity can be sustained with good stability over long periods are in great demand. In addition, when large items are produced by RTM molding, because it is technically difficult to heat the mold uniformly to the appropriate temperature, low viscosity matrix resins which can be impregnated with reinforced fiber even at room temperature are required. When the atmospheric temperature is raised, thermosetting resins typically display a decrease in initial viscosity, although the rate with which the viscosity rises increases. In contrast, when the atmospheric temperature is lowered, the rate of viscosity increase slows and the resin viscosity becomes more stable, although the viscosity level itself increases. Consequently, it has proved very difficult to sustain a low viscosity with good stability over long periods at room temperature.

A liquid form matrix system epoxy resin composition with a dynamic viscosity at 40° C. of no more than 400 mPa·s has been disclosed in Japanese Unexamined Patent Application, First Publication No. Sho 57-51719. However, the elastic modulus of the cured product produced by curing this epoxy resin composition is unsatisfactory, and the resin is unsuitable as a matrix resin for a fiber reinforced composite material. Furthermore, if this resin is used within an RTM molding method, then additional problems arise such as the need to heat the mold during impregnation of the reinforced fiber.

Furthermore, low viscosity epoxy resin compositions which use a carboxylic acid anhydride as the curing agent have been widely reported as low viscosity liquid epoxy resins, but such compositions require considerable care in handling as the carboxylic acid anhydride readily absorbs moisture.

DISCLOSURE OF INVENTION

An object of the present invention is to provide an epoxy resin composition which has a low viscosity at room temperature which can moreover be sustained with good stability for long periods, is easy to handle, produces a cured product on curing with excellent heat resistance and superior mechanical characteristics such as compression characteristics, tensile characteristics and impact resistance, and is particularly suitable as a fiber reinforced composite material matrix resin for forming aircraft components.

An epoxy resin composition of the present invention comprises (A) at least one of a bisphenol type epoxy resin (A1) or a phenol novolak type epoxy resin (A2), a polyvalent epoxy resin formed from a mononuclear aromatic backbone (B), and an aromatic amine curing agent (C), and displays a viscosity at 25° C. of no more than 1000 mPa·s, and furthermore a cured product produced by curing the epoxy resin composition displays a breaking elongation of at least 5%.

BEST MODE FOR CARRYING OUT THE INVENTION

The bisphenol type epoxy resin (A1) used in an epoxy resin composition of the present invention is preferably a bisphenol F type or a bisphenol A type epoxy resin with an epoxy equivalence of no more than 200 g/mol. Furthermore, the phenol novolak type epoxy resin (A2) is preferably a phenol novolak type resin with an epoxy equivalence of no more than 200 g/mol. Either one of the bisphenol type epoxy resin (A1) and the phenol novolak type epoxy resin (A2) may be used separately, or a mixture of the two may also be used. Bisphenol A type or bisphenol F type epoxy resins with a viscosity at room temperature of no more than 6000 cps are particularly preferred.

The polyvalent epoxy resin formed from a mononuclear aromatic backbone (B) should preferably utilize a bivalent epoxy resin, and where necessary, a combination of a bivalent epoxy resin and a trivalent epoxy resin may also be used. By using a bivalent epoxy resin formed from a mononuclear aromatic backbone (B1), the viscosity of the final product epoxy resin composition is low, and the elastic modulus of the cured product produced therefrom also increases. Consequently, when the epoxy resin composition is used as a matrix resin, the moldability when forming a fiber reinforced composite material improves, making the product fiber reinforced composite material suitable for use in aircraft components and the like. Furthermore, if a trivalent epoxy resin formed from a mononuclear aromatic backbone (B2) is also used, then the viscosity of the final product epoxy resin composition is even lower, the moldability improves even further, and the heat resistance of the cured product is also superior.

Amongst bivalent epoxy resins formed from a mononuclear aromatic backbone (B1), glycidylaniline based bivalent epoxy resins and derivatives thereof, and glycidyl-o-toluidine based bivalent epoxy resins are preferred. Amongst trivalent epoxy resins formed from a mononuclear aromatic backbone (B2), aminophenol based trivalent epoxy resins such as triglycidyl-p-aminophenol based epoxy resins are preferred. Specific examples of glycidylaniline based bivalent epoxy resins include commercially available products such as GAN and GOT manufactured by Nippon Kayaku Ltd., whereas specific examples of aminophenol based trivalent epoxy resins include the triglycidyl-p-aminophenol based epoxy resins marketed by Ciba-Geigy Ltd. under the brand names Araldite MY0500 and Araldite MY0510, and ELM-100 manufactured by Sumitomo Chemical Industries Ltd.

Compounds with a phenolic hydroxyl group may also be used as the polyvalent epoxy resin (B), although phenolic hydroxyl groups can lead to increases in the hygroscopicity of the cured resin, and consequently compounds which do not incorporate a phenolic hydroxyl group are preferred.

There are no particular restrictions on the relative proportions of the bisphenol type epoxy resin (A1) and/or the phenol novolak type epoxy resin (A2), and the polyvalent epoxy resin formed from a mononuclear aromatic backbone (B), although a ratio of 20 to 110 parts by weight of the polyvalent epoxy resin formed from a mononuclear aromatic backbone (B) for every 100 parts by weight of the bisphenol type epoxy resin (A1) and/or the phenol novolak type epoxy resin (A2) (namely, the component (A)) is preferred.

An even more preferred combination utilizes 100 parts by weight of at least one of the bisphenol type epoxy resin (A1) and the phenol novolak type epoxy resin (A2) (namely, the component (A)), together with 20 to 100 parts by weight, and most preferably 25 to 50 parts by weight, of a bivalent epoxy resin formed from a mononuclear aromatic backbone (B1). If the amount of the bivalent epoxy resin formed from a mononuclear aromatic backbone (B1) is less than 20 parts by weight, then the viscosity of the epoxy resin composition may not be sufficiently low, whereas if the amounts exceeds 100 parts by weight, then the heat resistance and the degree of elongation of the cured product produced by curing the epoxy resin composition may deteriorate.

In those cases in which a trivalent epoxy resin formed from a mononuclear aromatic backbone (B2) is also included in the composition, the amount of this trivalent epoxy resin should preferably be no more than 100 parts by weight per 100 parts by weight of the bisphenol type epoxy resin (A1) and/or the phenol novolak type epoxy resin (A2) (namely, the component (A)). If the amount of the trivalent epoxy resin (B2) exceeds 100 parts by weight, then the degree of elongation of the cured product produced by curing the epoxy resin composition may deteriorate. In those cases in which a bivalent epoxy resin formed from a mononuclear aromatic backbone (B1) and a trivalent epoxy resin formed from a mononuclear aromatic backbone (B2) are used in combination, the combination of the two compounds should preferably fall within a range from 20 to 110 parts by weight for every 100 parts by weight of the bisphenol type epoxy resin (A1) and/or the phenol novolak type epoxy resin (A2) (namely, the component (A)).

The curing agent (C) added to the epoxy resin composition is preferably an aromatic amine based curing agent, as these result in superior mechanical characteristics, heat resistance and chemical resistance in the cured product produced by curing the epoxy resin composition. Of these aromatic amine based curing agents, liquid form amine curing agents derived from the phenylenediamine represented by the formula (1) shown below are preferred, as the resulting product epoxy resin composition displays a low viscosity which can be maintained for long periods, and moreover the cured product thereof also displays excellent physical properties.

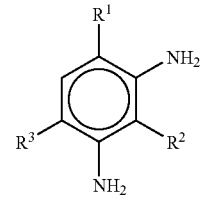

(1)

(wherein, $R^1$, $R^2$ and $R^3$ represent any one of a methyl group, an ethyl group, an oxymethyl group and a thiomethyl group, and $R^1$, $R^2$ and $R^3$ may be identical or different)

Specific examples of this type of curing agent include diethyltoluenediamine, which is marketed by Albemarle Ltd. under the brand name Ethacure-100, and dithiomethyltoluenediamine, which is marketed by Albemarle Ltd. under the brand name Ethacure-300.

The amount of the curing agent (C) added will vary depending on the curing mechanism of epoxy group by the curing agent (C), as well as on the number of mols, of epoxy groups within the bisphenol type epoxy resin (A1) and/or the phenol novolak type epoxy resin (A2) (namely, the component (A)), and the polyvalent epoxy resin formed from a mononuclear aromatic backbone (B). Preferably, sufficient curing agent is added to allow from 0.4 to 0.6 mols of amino groups within the curing agent (C) for every 1 mol of epoxy groups within the epoxy resins ((A)+(B)).

Furthermore, a rubber constituent (D) may also be added to an epoxy resin composition of the present invention. If a rubber constituent (D) is added, then the toughness of the cured product is even greater. Amongst potential rubber constituents (D), butadiene rubbers and acrylic rubbers are preferred, and acrylic rubber with a high degree of elongation is particularly desirable. The rubber constituent (D) may be added alone to the epoxy resin composition, although a material in which the rubber constituent (D) has been already dispersed in resin may also be added. Examples of commercially available epoxy resins containing an acrylic rubber component include XU3508 from Ciba-Geigy Ltd., which is a bisphenol A type epoxy resin with an acrylic rubber constituent dispersed therein (acrylic rubber content of 20% by weight), and BPF307 from Nippon Shokubai Ltd., which is a bisphenol F type epoxy resin with an acrylic rubber constituent dispersed therein (acrylic rubber content of 18% by weight).

The rubber constituent (D) should preferably be added at a rate of 1 to 20 parts by weight, and even more preferably 5 to 20 parts by weight, for every 100 parts by weight of the bisphenol type epoxy resin (A1) and/or the phenol novolak type epoxy resin (A2) (namely, the component (A)). If the amount of the rubber constituent (D) exceeds 20 parts by weight, then the viscosity of the epoxy resin composition may increase; and the elastic modulus of the cured product may decrease. In contrast, at amounts less than 1 parts by weight, the increase in toughness may be insufficient. In those cases in which the rubber constituent (D) is dispersed in a resin before addition to the composition, and particularly in those cases in which this resin is one of either the bisphenol type epoxy resin (A1), the phenol novolak type epoxy resin (A2) or the polyvalent epoxy resin formed from a mononuclear aromatic backbone (B), the amount of resin added with the constituent (D) must be considered when determining the total amount of each constituent.

If required, curing accelerators or fillers may also be added to an epoxy resin composition of the present invention.

Curing accelerators are added after the epoxy resin composition has been impregnated into a reinforced fiber, and are materials designed to cure the resin composition within a short timeframe, thereby shortening the molding cycle. As a result, the addition of a curing accelerator usually causes a more rapid increase in the viscosity of the epoxy resin composition, and consequently considerable care must be taken in selecting the type of curing accelerator used, and the amount added to a composition. Examples of preferred curing accelerators include $BF_3$ amine complexes such as $BF_3$-monoethylamine, imidazoles such as 2-ethyl-4-methylimidazole, and urea compounds such as phenyldimethylurea. The amount of such curing accelerators added should preferably be restricted to no more than 5 parts by weight, and even more preferably no more than 2 parts by weight.

Fillers have the function of improving the elastic modulus of the cured product produced by curing the epoxy resin composition, although the addition of a filler usually causes an increase in the viscosity of the epoxy resin composition and a decrease in the elongation of the cured product, and consequently considerable care must be taken in selecting the type of filler used, and the amount added to a composition. Examples of preferred fillers include silica, fused silica, calcium carbonate and hydrated alumina, and the amount of such fillers should preferably be restricted to no more than 10 parts by weight.

An epoxy resin composition of the present invention has a viscosity at 25° C. of no more than 1000 mPa·s, displays excellent moldability, and is suitable for use in RTM molding methods. In addition, if the viscosity is less than 500 mPa·s, then the composition becomes ideal for the production of fiber reinforced composite materials using RTM methods. In contrast, if the viscosity at 25° C. exceeds 1000 mPa·s, then handling of the epoxy resin composition becomes difficult during the curing process, and the production of cured products of a complex shape, or particularly large cured products, becomes impossible.

This type of epoxy resin composition is cured by heating for 2 to 5 hours at 150 to 180° C., and the thus obtained cured product displays a high breaking elongation value. Breaking elongation describes the elongation of a test sample in a bending experiment at the point of rupture. If the breaking elongation is 5% or greater, then a fiber reinforced composite material with superior tensile characteristics can be obtained. Furthermore, breaking elongation values of at least 7% are even more preferred. In addition, if the fracture toughness value $K_{IC}$ for the cured product is at least 0.8 MPa·m$^{1/2}$, then a fiber reinforced composite material with even better impact resistance can be obtained. The fracture toughness value $K_{IC}$ refers to a value measured using a SENB (Single Edge Notched Bend) test method, in accordance with ASTM D5045. Furthermore, if the glass transition temperature of the cured product is also at least 100° C., and the elastic modulus is at least 3 GPa, then a fiber reinforced composite material with excellent compression characteristics can be produced.

There are no particular restrictions on the potential uses of this type of epoxy resin composition, and a wide range of applications including sealants for electronic materials, paints, paving materials, and adhesives are possible. However, this type of epoxy resin composition has a low viscosity at room temperature, and furthermore this low viscosity can be sustained with good stability over long periods, and the composition is also easy to handle, and produces a cured product on curing which displays excellent mechanical characteristics and heat resistance, and consequently is ideally suited for use in fiber reinforced composite materials.

There are no particular restrictions on the method of producing the fiber reinforced composite material, and suitable methods include RTM molding methods, draw molding methods, and filament winding molding methods. Furthermore, there are no particular restrictions on the reinforced fiber, and fibers such as carbon fiber, glass fiber, organic fiber, boron fiber and steel fiber can be used in the form of rattan, cloth, chopped fiber or mats.

Furthermore, there are no particular restrictions on the use of the fiber reinforced composite materials, and one potential use includes everyday items such as fishing rods and golf club shafts, but a fiber reinforced composite material which uses an epoxy resin composition of the present invention displays excellent strength, and good heat resistance, compression characteristics, tensile characteristics, and impact resistance, and as such is ideally suited for use in aircraft components.

EXAMPLES

As follows is a description of specific examples of epoxy resin compositions of the present invention, as well as fiber reinforced composite materials which use these epoxy resin compositions.

The test methods used for determining the physical properties of the epoxy resin compositions and the cured products of these epoxy resin compositions are described below.

[Evaluation of Uncured Epoxy Resin Compositions]

<Viscosity Measurements>
Apparatus: RDA-700 manufactured by Rheometrics Ltd.
Measurement conditions: Disk Plate 25 mm ϕ
  Gap 0.5 mm
  Rate 10 rad/sec
  Measurement temperature 25° C.

<Evaluation of Viscosity Stability for Uncured Epoxy Resin Compositions>

The isothermal viscosity at 25° C. was measured using the viscosity measurement method described above, and the sample was observed to determine whether a viscosity of no more than 1000 mPa·s could be sustained for at least two hours. For those resin compositions for which this low viscosity could be sustained, the viscosity stability is recorded in Table 2 and Table 4 using the symbol O.

[Evaluation of Cured Products of Epoxy Resin Compositions]

<Glass Transition Temperature (Tg)>
Sample shape: 60 mm (length)×12 mm (width)×2 mm (thickness)
Apparatus: RDA-700 manufactured by Rheometrics Ltd.
Measurement conditions: 5° C./step with increasing temperature
Rate: 10 rad/sec Using the method described above, the storage elastic modulus G' was plotted against the temperature, producing a temperature—G' curve. A tangent was then drawn to G' in the region where the composition was in a glass like state, and a tangent was also drawn from the transition region, where the value of G' is changing rapidly, and the intersection of these two tangents was deemed to be the Tg value for the cured product.

<Elastic Modulus, Strength, Elongation>

The elastic modulus, the strength and the elongation for cured products of epoxy resin compositions were measured using a bending test (three point bending) method, under the following conditions.

Sample shape: 60 mm (length)×8 mm (width)×2 mm (thickness)
Apparatus: Tensilon manufactured by Orientech Inc.
L/D (=distance between support points/thickness): 16
Radius of Indenter Tip: 3.2 mm
Cross Head Speed: 2 mm/min <Resin Fracture Toughness $K_{IC}$>

The $K_{IC}$ value of cured products of epoxy resin compositions were measured using a SENB (Single Edge Notched Bend) test method in accordance with ASTM D5045, under the following conditions.

Sample shape: 26.4 mm (length)×3 mm (width)×6 mm (thickness)
Notch length: 3 mm
Apparatus: Tensilon manufactured by Orientech Inc.
Span: 24 mm
Radius of Indenter Tip: 5 mm
Cross Head Speed: 1 mm/min

EXAMPLES 1 TO 5

Epoxy resin compositions were prepared with the relative compositions shown in Table 1 below. The numbers in Table 1 refer to parts by weight. The viscosity of each epoxy resin composition at 25° C., and the viscosity stability thereof, together with the results of bending tests (elastic modulus, strength, breaking elongation) and measurements of Tg and $K_{IC}$ on the cured product of each epoxy resin composition are shown in Table 2.

The curing conditions used in converting each of the epoxy resin compositions of the examples 1 to 4 into a cured product involved heating each composition for two hours at 180° C., whereas the curing conditions used in converting the epoxy resin composition of the example 5 into a cured product involved heating the composition for three hours at 180° C.

COMPARATIVE EXAMPLES 1 TO 5

Epoxy resin compositions were prepared with the relative compositions shown in Table 1 below. The numbers in Table 1 refer to parts by weight. The viscosity of each epoxy resin composition at 25° C., and the viscosity stability thereof, together with the results of bending tests (elastic modulus, strength, breaking elongation) and measurements of Tg and $K_{IC}$ on the cured product of each epoxy resin composition are shown in Table 2.

The curing conditions used in converting each of the epoxy resin compositions of the comparative examples 1 to 5 into a cured product involved heating each composition for two hours at 180° C. In the case of the epoxy resin composition of the comparative example 5, the viscosity at 25° C. was extremely high at 2057 mPa·s, and impregnating this composition with fiber at room temperature proved difficult.

The abbreviations used in the tables refer to the compounds described below.

EP-828: Epikote 828 (a bisphenol A type epoxy resin manufactured by Yuka Shell Epoxy Ltd.)

DER332: A bisphenol A type epoxy resin (manufactured by The Dow Chemical Company Ltd.)

Ep-807: Epikote 807 (a bisphenol F type epoxy resin manufactured by Yuka Shell Epoxy Ltd.)

EXA-830LVP: A bisphenol F type epoxy resin (manufactured by Dainippon Ink and Chemicals Ltd.)

GAN: A diglycidylaniline type polyvalent (bivalent) epoxy resin (manufactured by Nippon Kayaku Ltd.)

GOT: A diglycidyl-o-toluidine type polyvalent (bivalent) epoxy resin (manufactured by Nippon Kayaku Ltd.)

MY0510: A triglycidyl-p-aminophenol type polyvalent (trivalent) epoxy resin (manufactured by Ciba-Geigy Ltd.)

RD-2: A butanediol diglycidyl ether type polyvalent (bivalent) epoxy resin (manufactured by Ciba-Geigy Ltd.)

ET-100: Ethacure-100 (diethyltoluenediamine manufactured by Albemarle Ltd.) ET-300: Ethacure-300 (dithiomethyltoluenediamine manufactured by Albemarle Ltd.)

HT9664: Diaminodiphenylsulfone fine powder (manufactured by Ciba-Geigy Ltd.)

XU3507: A bisphenol A type epoxy resin containing an acrylic rubber (manufactured by Ciba-Geigy Ltd., acrylic rubber content of 20% by weight)

BPF307: A bisphenol F type epoxy resin with cross linked acrylic rubber particles dispersed therein (manufactured by Nippon Shokubai Ltd., acrylic rubber content of 18% by weight)

Ricon 130MA: A maleic acid adduct type polybutadiene rubber (manufactured by Ricon Resin, Inc.)

TABLE 1

| | (A) | | | | (B) | | (C) | | |
|---|---|---|---|---|---|---|---|---|---|
| No. | Ep-828 | Ep-807 | EXA-830 LVP | GAN | GOT | RD-2 | ET-100 | ET-300 | HT9664 |
| Example 1 | 100 | | | | 50 | | 40 | | |
| Example 2 | | 100 | | 50 | | | 44 | | |
| Comparative example 1 | | 100 | | 120 | | | 65 | | |
| Comparative example 2 | 32 | 68 | | | | 5 | 25 | | |
| Comparative example 3 | | | 100 | | | 20 | 35 | | |

TABLE 1-continued

| | (A) | | | | | | (C) | | |
|---|---|---|---|---|---|---|---|---|---|
| | Ep- | Ep- | EXA-830 | (B) | | | ET- | ET- | |
| No. | 828 | 807 | LVP | GAN | GOT | RD-2 | 100 | 300 | HT9664 |
| Example 3 | | | 100 | | 20 | | 35 | | |
| Example 4 | | | 100 | | 30 | | 38 | | |
| Comparative example 4 | | | 100 | | | 30 | 38 | | |
| Comparative example 5 | | | 100 | | 100 | | | | 86 |
| Example 5 | | | 100 | | 30 | | | 46 | |

TABLE 2

| No. | Viscosity mPa·s | Viscosity stability | Tg °C. | Elastic modulus GPa | Strength MPa | Breaking elongation % | $K_{IC}$ MPa·m$^{1/2}$ |
|---|---|---|---|---|---|---|---|
| Example 1 | 875 | ○ | 156 | 3.08 | 138 | 9.7 | 0.80 |
| Example 2 | 808 | ○ | 128 | 3.43 | 150 | 9.2 | not measured |
| Comparative example 1 | 342 | ○ | 121 | 3.68 | 153 | 4.3 | not measured |
| Comparative example 2 | 950 | ○ | 149 | 2.55 | 120 | 11.3 | not measured |
| Comparative example 3 | 502 | ○ | 106 | 2.54 | 120 | 11.3 | not measured |
| Example 3 | 686 | ○ | 127 | 3.12 | 145 | 10.5 | 0.92 |
| Example 4 | 472 | ○ | 120 | 3.30 | 155 | 10.1 | 0.87 |
| Comparative example 4 | 358 | ○ | 97 | 2.35 | 117 | 11.3 | not measured |
| Comparative example 5 | 2057 | X | 145 | 4.02 | 178 | 4.8 | not measured |
| Example 5 | 563 | ○ | 120 | 3.52 | 158 | 11.1 | 0.89 |

EXAMPLES 6 TO 11

Epoxy resin compositions were prepared with the relative compositions shown in Table 3 below. The numbers in Table 3 refer to parts by weight. The viscosity of each epoxy resin composition at 25° C., and the viscosity stability thereof, together with the results of bending tests (elastic modulus, strength, breaking elongation) and measurements of Tg and $K_{IC}$ on the cured product of each epoxy resin composition are shown in Table 4.

The curing conditions used in converting each of the epoxy resin compositions of the examples 6 to 11 into a cured product involved heating each composition for two hours at 180° C.

COMPARATIVE EXAMPLE 6

An epoxy resin composition was prepared with the composition shown in Table 3 below. The numbers in Table 3 refer to parts by weight. The viscosity of the epoxy resin composition at 25° C., and the viscosity stability thereof, together with the results of bending tests (elastic modulus, strength, breaking elongation) and measurements of Tg and $K_{IC}$ on the cured product of the epoxy resin composition are shown in Table 4.

The curing conditions used in converting the epoxy resin composition of the comparative example 6 to into a cured product involved heating the composition for two hours at 180° C.

TABLE 3

| | (A) | | | (D) | | | (B) | (C) |
|---|---|---|---|---|---|---|---|---|
| No. | DER332 | EXA-830 LVP | BPF307 | XU3508 | Ricon 130MA | GOT | MY0510 | ET-100 |
| Example 6 | 100 | | | | | 20 | 40 | 52 |
| Example 7 | | 100 | | | | 30 | 25 | 52 |
| Example 8 | 35 | 35 | | 30 | | 50 | 50 | 70 |
| Example 9 | | 70 | 30 | | | 50 | 50 | 70 |

TABLE 3-continued

| | (A) | | | (D) | | (B) | | (C) |
|---|---|---|---|---|---|---|---|---|
| | | EXA-830 | | | Ricon | | | |
| No. | DER332 | LVP | BPF307 | XU3508 | 130MA | GOT | MY0510 | ET-100 |
| Example 10 | | 70 | | 30 | | 50 | 50 | 70 |
| Example 11 | | 80 | | | 20 | 50 | 50 | 66 |
| Comparative example 6 | | 100 | | | | 50 | 50 | 72 |

TABLE 4

| No. | Viscosity mPa·s | Viscosity stability | Tg °C. | Elastic modulus GPa | Strength MPa | Breaking elongation % | $K_{IC}$ MPa·m$^{1/2}$ |
|---|---|---|---|---|---|---|---|
| Example 6 | 750 | ○ | 168 | 3.18 | 150 | 6.5 | 0.82 |
| Example 7 | 540 | ○ | 132 | 3.01 | 145 | 9.2 | 0.85 |
| Example 8 | 725 | ○ | 146 | 3.02 | 147 | 8.7 | 0.86 |
| Example 9 | 535 | ○ | 135 | 3.07 | 149 | 9.7 | 0.91 |
| Example 10 | 516 | ○ | 138 | 3.21 | 153 | 9.2 | 0.89 |
| Example 11 | 540 | ○ | 135 | 3.00 | 146 | 5.6 | 0.82 |
| Comparative example 6 | 465 | ○ | 139 | 3.32 | 156 | 4.8 | 0.75 |

INDUSTRIAL APPLICABILITY

An epoxy resin composition according to the present invention has a low viscosity of no more than 1000 mPa·s at 25° C. (room temperature), and this low viscosity can be sustained with good stability over long periods of time, and the composition consequently displays excellent impregnation into reinforced fibers at room temperature.

In addition, a cured product produced by curing an epoxy resin composition of the present invention displays excellent heat resistance and mechanical characteristics.

Consequently, an epoxy resin composition of the present invention is ideally suited to application as a matrix resin for fiber reinforced composite materials, and by using a resin composition of the present invention, a fiber reinforced composite material can be produced with good levels of productivity at room temperature, using RTM molding, draw molding or filament winding methods.

The present invention can be effectively implemented in a variety of other forms, provided the spirit or gist of the present invention is retained. The examples presented above are merely representative examples, and in no way restrict the scope of the invention. Furthermore, the scope of the present invention is defined by the claims, and is in no way restricted by the contents of the above description. In addition, modifications and variations of the present invention covered by the scope of the claims are all deemed to fall within the scope of the present invention.

The invention claimed is:

1. An epoxy resin composition with a viscosity at 25° C. of no more than 1000 mPa·s, comprising (A) at least one of a bisphenol epoxy resin (A1) and a phenol novolak epoxy resin (A2), a diglycidylaniline resin or a derivative thereof, an aromatic amine curing agent (C), and a rubber constituent (D), wherein a cured product produced by curing said epoxy resin composition displays a breaking elongation of at least 5%.

2. An epoxy resin composition with a viscosity at 25° C. of no more than 1000 mPa·s, comprising 100 parts by weight of (A) at least one of a bisphenol epoxy resin (A1) and a phenol novolak epoxy resin (A2), 20 to 100 parts by weight of a diglycidylaniline resin or a derivative thereof, no more than 100 parts by weight of a trivalent epoxy resin formed from a mononuclear aromatic backbone (B2), a phenylenediamine derivative represented by a formula (1) shown below as an aromatic amine curing agent (C), and 1 to 20 parts by weight of a rubber constituent (D),

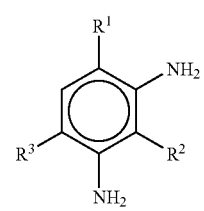

(1)

(wherein, $R^1$, $R^2$ and $R^3$ represent any one of a methyl group, an ethyl group, an oxymethyl group and a thiomethyl group, and $R^1$, $R^2$ and $R^3$ may be identical or different), wherein a cured product produced by curing said epoxy resin composition displays a breaking elongation of at least 5%.

3. An epoxy resin composition according to claim 1, wherein said rubber constituent (D) is an acrylic rubber.

4. An epoxy resin composition according to claim 2, wherein said trivalent epoxy resin formed from a mononuclear aromatic backbone (B2) is a triglycidyl-p-aminophenol epoxy resin.

5. An epoxy resin composition according claim 2, wherein a fracture toughness value $K_{IC}$ is at least 0.8 MPa m$^{1/2}$.

6. An epoxy resin composition according to claim 2, wherein a cured product thereof displays a glass transition temperature of at least 100° C. and an elastic modulus of at least 3 GPa.

7. An epoxy resin composition according to claim 2, wherein said rubber constituent (D) is an acrylic rubber.

8. A fiber reinforced composite material comprising an epoxy resin composition according to claim 2 as a matrix resin.

9. An epoxy resin composition with a viscosity at 25° C. of no more than 1000 mPa·s, comprising (A) at least one of a bisphenol epoxy resin (A1) and a phenol novolak epoxy resin (A2), a diglycidyl-o-toluidine resin, an aromatic amine curing agent (C), and a rubber constituent (D), wherein a cured product produced by curing said epoxy resin composition displays a breaking elongation of at least 5%.

10. An epoxy resin composition according to claim 9, wherein said rubber constituent (D) is an acrylic rubber.

11. An epoxy resin composition with a viscosity at 25° C. of no more than 1000 mPa·s, comprising 100 parts by weight of (A) at least one of a bisphenol epoxy resin (A1) and a phenol novolak epoxy resin (A2), 20 to 100 parts by weight of a diglycidyl-o-toluidine resin, no more than 100 parts by weight of a trivalent epoxy resin formed from a mononuclear aromatic backbone (B2), a phenylenediamine derivative represented by a formula (1) shown below as an aromatic amine curing agent (C), and 1 to 20 parts by weight of a rubber constituent (D),

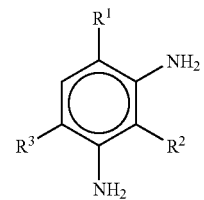

(wherein, $R^1$, $R^2$ and $R^3$ represent any one of a methyl group, an ethyl group, an oxymethyl group and a thiomethyl group, and $R^1$, $R^2$ and $R^3$ may be identical or different), wherein a cured product produced by curing said epoxy resin composition displays a breaking elongation of at least 5%.

12. An epoxy resin composition according to claim 11, wherein said rubber constituent (D) is an acrylic rubber.

13. An epoxy resin composition according to claim 11, wherein said trivalent epoxy resin formed from a mononuclear aromatic backbone (B2) is a triglycidyl-p-aminophenol epoxy resin.

14. An epoxy resin composition according claim 11, wherein a fracture toughness value $K_{IC}$ is at least 0.8 MPa $m^{1/2}$.

15. An epoxy resin composition according to claim 11, wherein a cured product thereof displays a glass transition temperature of at least 100° C. and an elastic modulus of at least 3 GPa.

16. A fiber reinforced composite material which comprises an epoxy resin composition according to claim 2 as a matrix resin.

* * * * *